(12) United States Patent
Lazaridis et al.

(10) Patent No.: US 9,645,728 B2
(45) Date of Patent: May 9, 2017

(54) PORTABLE ELECTRONIC DEVICE AND METHOD THEREFOR

(75) Inventors: Mihal Lazaridis, Waterloo (CA); Danny Thomas Dodge, Ottawa (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 358 days.

(21) Appl. No.: 13/240,250

(22) Filed: Sep. 22, 2011

(65) Prior Publication Data

US 2012/0131501 A1 May 24, 2012

Related U.S. Application Data

(60) Provisional application No. 61/386,302, filed on Sep. 24, 2010.

(51) Int. Cl.
G06F 17/00 (2006.01)
G06F 3/0488 (2013.01)
(Continued)

(52) U.S. Cl.
CPC .......... *G06F 3/0488* (2013.01); *G06F 3/0481* (2013.01); *G06F 3/0483* (2013.01); *G06F 9/443* (2013.01); *G06F 17/30126* (2013.01)

(58) Field of Classification Search
CPC .......... G06F 3/048; G06F 2203/04803; G06F 17/30126
(Continued)

(56) References Cited

U.S. PATENT DOCUMENTS 5,177,328 A 1/1993 Ito et al.
5,579,036 A 11/1996 Yates
(Continued)

FOREIGN PATENT DOCUMENTS

CN 1902599 A 1/2007
CN 101052939 10/2007
(Continued)

OTHER PUBLICATIONS

Android 2.2 User Guide. Manual (online). Google Inc., May 20, 2010, retrieved from the Internet on Aug. 2, 2010, pp. 1-336.
(Continued)

*Primary Examiner* — Stephen Hong
*Assistant Examiner* — Gregory J Vaughn
(74) *Attorney, Agent, or Firm* — Borden Ladner Gervais LLP; Todd Keeler

(57) ABSTRACT

An electronic device is provided including a display, a processor and a memory. The processor is coupled to the display and the memory to carry out a method of facilitating user interface navigation in the electronic device. In a first view shown on the display, a first application interface provides a visual representation of a first application. In response to receiving a navigational command to access a second application visually represented by a second application interface, a transitional view is displayed including a transition between the first application interface and the second application interface. The displayed transition can be dependent on a property of the received navigational command. The first and second application interfaces can be displayed to appear in a non-overlapping arrangement on a planar surface, and can have sheet-like properties or behaviors.

15 Claims, 10 Drawing Sheets

(51) Int. Cl.
  *G06F 17/30* (2006.01)
  *G06F 9/44* (2006.01)
  *G06F 3/0481* (2013.01)
  *G06F 3/0483* (2013.01)

(58) Field of Classification Search
  USPC ....... 715/200, 201, 203, 243, 246, 247, 251, 715/252, 273, 277
  See application file for complete search history.

(56) References Cited

U.S. PATENT DOCUMENTS

| | | | |
|---|---|---|---|
| 5,579,487 A | 11/1996 | Meyerson et al. | |
| 5,754,809 A | 5/1998 | Gandre | |
| 5,861,874 A | 1/1999 | Joto | |
| 6,088,024 A | 7/2000 | Yamagata | |
| 6,437,836 B1 | 8/2002 | Huang et al. | |
| 6,473,069 B1 | 10/2002 | Gerpheide | |
| 6,819,315 B2 | 11/2004 | Toepke et al. | |
| 6,833,827 B2 | 12/2004 | Lui et al. | |
| 7,656,393 B2 | 2/2010 | King et al. | |
| 8,184,108 B2 | 5/2012 | Smits | |
| 8,238,876 B2* | 8/2012 | Teng et al. | 455/411 |
| 8,291,344 B2* | 10/2012 | Chaudhri | G06F 3/04883 715/736 |
| 8,355,698 B2* | 1/2013 | Teng et al. | 455/411 |
| 8,456,447 B2 | 6/2013 | Newton | |
| 8,464,146 B2* | 6/2013 | Kang | 715/234 |
| 8,477,082 B2* | 7/2013 | Lee et al. | 345/2.1 |
| 8,533,844 B2* | 9/2013 | Mahaffey et al. | 726/25 |
| 8,539,376 B2* | 9/2013 | Utsuki et al. | 715/835 |
| 8,659,555 B2 | 2/2014 | Pihlaja | |
| 2001/0028365 A1 | 10/2001 | Ludolph | |
| 2002/0167489 A1 | 11/2002 | Davis | |
| 2002/0175836 A1 | 11/2002 | Roberts | |
| 2003/0156124 A1 | 8/2003 | Good et al. | |
| 2004/0260427 A1* | 12/2004 | Wimsatt | 700/275 |
| 2005/0030291 A1 | 2/2005 | Yanagisawa | |
| 2005/0063149 A1 | 3/2005 | Shimamoto et al. | |
| 2005/0162406 A1 | 7/2005 | Ono et al. | |
| 2005/0289476 A1 | 12/2005 | Tokkonen | |
| 2006/0050061 A1 | 3/2006 | Aiken et al. | |
| 2006/0055685 A1 | 3/2006 | Rimas-Ribikauskas et al. | |
| 2006/0111182 A1 | 5/2006 | Nakanishi et al. | |
| 2006/0121985 A1 | 6/2006 | Nakanishi et al. | |
| 2006/0146055 A1 | 7/2006 | Chow et al. | |
| 2006/0197750 A1 | 9/2006 | Kerr et al. | |
| 2006/0238517 A1 | 10/2006 | King et al. | |
| 2007/0063987 A1 | 3/2007 | Sato et al. | |
| 2007/0174786 A1 | 7/2007 | Doi et al. | |
| 2007/0250787 A1 | 10/2007 | Kawahara et al. | |
| 2007/0262964 A1 | 11/2007 | Zotov et al. | |
| 2008/0001924 A1 | 1/2008 | de los Reyes et al. | |
| 2008/0007175 A1 | 1/2008 | Park | |
| 2008/0051642 A1 | 2/2008 | Krupnik | |
| 2008/0122796 A1* | 5/2008 | Jobs | G06F 3/0488 345/173 |
| 2008/0165141 A1 | 7/2008 | Christie | |
| 2008/0222545 A1 | 9/2008 | Lemay et al. | |
| 2008/0238884 A1 | 10/2008 | Harish | |
| 2008/0273014 A1 | 11/2008 | Lowles et al. | |
| 2008/0284754 A1 | 11/2008 | Kao et al. | |
| 2009/0023395 A1* | 1/2009 | Chang et al. | 455/74.1 |
| 2009/0046057 A1* | 2/2009 | Umezawa | 345/156 |
| 2009/0058820 A1 | 3/2009 | Hinckley | |
| 2009/0061837 A1 | 3/2009 | Chaudhri et al. | |
| 2009/0085886 A1 | 4/2009 | Huang et al. | |
| 2009/0093315 A1 | 4/2009 | Matsunaga et al. | |
| 2009/0119678 A1 | 5/2009 | Shih et al. | |
| 2009/0135214 A1 | 5/2009 | Suzuki | |
| 2009/0146970 A1 | 6/2009 | Lowles et al. | |
| 2009/0174679 A1 | 7/2009 | Westerman | |
| 2009/0189868 A1 | 7/2009 | Joo et al. | |
| 2009/0189875 A1 | 7/2009 | Ma | |
| 2009/0237362 A1 | 9/2009 | Wu et al. | |
| 2009/0278795 A1 | 11/2009 | Hansen et al. | |
| 2009/0278806 A1 | 11/2009 | Duarte | |
| 2010/0007675 A1 | 1/2010 | Kang et al. | |
| 2010/0020029 A1 | 1/2010 | Park et al. | |
| 2010/0058231 A1 | 3/2010 | Duarte et al. | |
| 2010/0073301 A1 | 3/2010 | Yousefpor et al. | |
| 2010/0088641 A1 | 4/2010 | Choi | |
| 2010/0100067 A1 | 4/2010 | Pugliese, III | |
| 2010/0105443 A1 | 4/2010 | Vaisanen | |
| 2010/0107067 A1 | 4/2010 | Vaisanen | |
| 2010/0110019 A1 | 5/2010 | Ozias | |
| 2010/0134422 A1 | 6/2010 | Borras | |
| 2010/0137027 A1 | 6/2010 | Kim | |
| 2010/0145629 A1 | 6/2010 | Botich et al. | |
| 2010/0175018 A1 | 7/2010 | Petschnigg et al. | |
| 2010/0175026 A1* | 7/2010 | Bortner et al. | 715/818 |
| 2010/0185989 A1 | 7/2010 | Shiplacoff et al. | |
| 2010/0194667 A1* | 8/2010 | Lee et al. | 345/2.1 |
| 2010/0199190 A1 | 8/2010 | Cadiz et al. | |
| 2010/0207911 A1 | 8/2010 | Newton | |
| 2010/0211872 A1* | 8/2010 | Rolston et al. | 715/702 |
| 2010/0214218 A1 | 8/2010 | Vaisanen et al. | |
| 2010/0229090 A1 | 9/2010 | Newton et al. | |
| 2010/0231539 A1 | 9/2010 | Cruz-Hernandez et al. | |
| 2010/0245242 A1 | 9/2010 | Wu et al. | |
| 2010/0245275 A1 | 9/2010 | Tanaka | |
| 2010/0246104 A1 | 9/2010 | Park et al. | |
| 2010/0269048 A1* | 10/2010 | Pahlavan et al. | 715/740 |
| 2010/0302172 A1 | 12/2010 | Wilairat | |
| 2011/0004845 A1 | 1/2011 | Ciabarra | |
| 2011/0004888 A1* | 1/2011 | Srinivasan et al. | 719/329 |
| 2011/0050607 A1 | 3/2011 | Park | |
| 2011/0164065 A1 | 7/2011 | Mate et al. | |
| 2011/0167382 A1 | 7/2011 | van Os | |
| 2011/0205163 A1 | 8/2011 | Hinckley et al. | |
| 2011/0205178 A1* | 8/2011 | Yoshida et al. | 345/173 |
| 2011/0208716 A1 | 8/2011 | Liu | |
| 2011/0209099 A1 | 8/2011 | Hinckley et al. | |
| 2011/0252381 A1* | 10/2011 | Chaudhri | G06F 3/04883 715/838 |
| 2011/0298743 A1 | 12/2011 | Machida et al. | |
| 2011/0298746 A1 | 12/2011 | Hotelling | |
| 2012/0021777 A1 | 1/2012 | Lazaridis et al. | |
| 2012/0056818 A1 | 3/2012 | Shafi et al. | |
| 2012/0231881 A1 | 9/2012 | Matsunaga | |
| 2013/0082978 A1 | 4/2013 | Horvitz et al. | |

FOREIGN PATENT DOCUMENTS

| | | |
|---|---|---|
| CN | 101432677 | 5/2009 |
| CN | 101438225 | 5/2009 |
| CN | 101527745 A | 9/2009 |
| DE | 102006045591 A1 | 5/2007 |
| EP | 2169521 | 3/2010 |
| EP | 2175359 | 4/2010 |
| EP | 2184671 A1 | 5/2010 |
| EP | 2214085 A2 | 8/2010 |
| JP | 10-113969 | 5/1998 |
| KR | 1020090017517 | 2/2009 |
| WO | WO 2006020304 | 2/2006 |
| WO | 2007133483 | 11/2007 |
| WO | WO 2009088672 | 7/2009 |
| WO | 2009143075 A2 | 11/2009 |
| WO | 2009154862 | 12/2009 |
| WO | 2010092993 | 8/2010 |

OTHER PUBLICATIONS

Samsung Vibrant, a Galaxy S phone, Portable Quad-Band Mobile Phone User Manual [online]. Samsung Telecommunications America LLC, 2010, retrieved from the internet on Nov. 22, 2011, pp. 1-189.

Bragdon et al., "Experimental Analysis of Touch-Screen Gesture Designs in Mobile Environments", CHI 2011, May 7-12, 2011 (10 pages).

(56) References Cited

OTHER PUBLICATIONS

Roth et al., "Bezel Swipe: Conflict-Free Scrolling and Multiple Selection on Mobile Touch Screen Devices", CHI 2009, Apr. 4-9, 2009 (4 pages).
International Patent Application No. PCT/CA2011/050589, Search Report dated Dec. 22, 2011.
Canadian Patent Application No. 2,811,253, Office Action dated May 21, 2014.
European Patent Application No. 11182356.3, European Search Report dated Oct. 15, 2014.
Canadian Patent Application Serial No. 2,812,288, Office Action dated Jun. 10, 2015.
German Patent Application Serial No. 112011101206.3, Office Action dated May 28, 2015. (no English translation available).
Chinese Patent Application Serial No. 201180021869.9, Office Action dated May 20, 2015. (no English translation available).
Chinese Patent Application Serial No. 201180045776.X, Office Action dated May 19, 2015. (no English translation available).
Chinese Patent Application Serial No. 201180021999.2, Office Action dated Jun. 26, 2015. (no English translation available).
3rd Office Action dated Aug. 2, 2016, issued in respect of related Chinese Patent Application No. 201180021869.9. (no English translation available).
Chinese Patent Application No. 201180045776.X; Rejection Decision dated Jun. 1, 2016. (with English translation).
German Patent Application No. 112011101209.8; Office Action dated Feb. 23, 2016. (no English translation available).
Crebolder, J.M. et al., "Visual Alerting in Complex Command and Control Environments", Proceedings of the Human Factors and Ergonomics Society 53rd Annual Meeting, Sage Publications, 2009, pp. 1329-1333.
Chinese Patent Application No. 201180021999.2; Office Action dated Mar. 7, 2016. (no English translation available).
European Patent Application No. 11182349.8; Extended European Search Report dated Feb. 11, 2016.
Chinese Patent Application No. 201180021869.9; Office Action dated Jan. 25, 2016. (no English translation available).
European Patent Application No. 11182641.8; Extended European Search Report dated Jan. 11, 2016.
European Patent Application No. 11182584.0; Extended European Search Report dated Jan. 15, 2016.
German Patent Application No. 112011101201.9; Office Action dated Dec. 3, 2015. (no English translation available).
German Patent Application No. 112011103202.1; Office Action dated Dec. 17, 2015. (no English translation available).
Canadian Patent Application No. 2,811,253; Office Action dated Nov. 24, 2015.
Chinese Patent Application No. 201180022020.3; Office Action dated Jan. 4, 2016. (no English translation available).
Chinese Patent Application No. 201180045776.X; Office Action dated Dec. 11, 2015. (no English translation available).
Chinese Patent Application No. 201180045776.X; Rejection Decision dated Jun. 1, 2016. (no English translation available).
Reexamination Notification dated Sep. 30, 2016 issued on related CN application No. 201180022020.3. No English translation is available.
Office Action dated Oct. 26, 2016, issued on related EP patent application No. 11182584.0.
Examinees Report dated Nov. 7, 2016, issued on corresponding CA patent application No. 2,811,253.
Chinese Patent Application No. 201180056762.8, First Office Action dated Jan. 4, 2017, without English Translation.
Chinese Patent Application No. 201180022020.3, Re-examination Decision dated Dec. 29, 2016, without English Translation.
Chinese Patent Application No. 201180021869.9, 4th Office Action dated Jan. 22, 2017—Without English Translation.
Chinese Patent Application No. 201180045776.X, Re-examination Notification dated Jan. 19, 2017—Without English Translation.

* cited by examiner

PORTABLE ELECTRONIC DEVICE AND METHOD THEREFOR

CROSS REFERENCE TO RELATED APPLICATIONS

This application claims the benefit of priority of U.S. Provisional Patent Application No. 61/386,302 filed on Sep. 24, 2010, which is incorporated herein by reference.

FIELD

The present disclosure relates to an electronic device including but not limited to a portable electronic device having a touch-sensitive display.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in electronic devices with touch-sensitive displays are desirable.

SUMMARY

According to one aspect, a portable electronic device includes: a display; a memory; and a processor coupled to the display and the memory. The memory stores statements and instructions for execution by the processor to carry out a method of: displaying, in a first view, a first application interface providing a visual representation of a first application; receiving a navigational command to access a second application visually represented by a second application interface; displaying, in a transitional view and in response to the received navigational command, a transition between the first application interface and the second application interface; and displaying, in a second view, the second application interface.

In an embodiment, the displayed transition between the first application interface and the second application interface is dependent on a property of the received navigational command.

In an example embodiment, the displayed transition between the first application interface and the second application interface comprises an appearance of a translational movement on a planar surface, an appearance of a rotational movement about an axis of rotation, an appearance of a twisting movement, or an appearance of a folding movement of the first application interface. In an example embodiment, the displayed transition between the first application interface and the second application interface comprises a portion of the first application interface and a portion of the second application interface.

In an example embodiment, in the transitional display state, the first and second application interfaces are displayed to appear in a non-overlapping arrangement on a planar surface. In an example embodiment, the first and second application interfaces have sheet-like properties.

According to another aspect, a method includes: displaying, in a first view on a display of a portable electronic device, a first application interface providing a visual representation of a first application; receiving a navigational command to access a second application visually represented by a second application interface; displaying, in a transitional view on the display and in response to the received navigational command, a transition between the first application interface and the second application interface; and displaying, in a second view on the display, the second application interface.

In another aspect, a non-transitory machine-readable memory is provided storing statements and instructions for execution by a processor to perform a method of facilitating user interface navigation as described and illustrated herein.

In a further aspect, a portable electronic device includes: a graphics memory, and a graphics engine to render in the graphics memory: a plurality of application interfaces, each providing a visual representation of an associated application user interface, where the plurality of application interfaces appear to be in a non-overlapping arrangement on a planar surface. The portable electronic device further includes: a display to display a portion of the content rendered to the graphics memory; a memory; and a processor coupled to the graphics memory, the graphics engine, the display and the memory. The memory stores statements and instructions for execution by the processor to carry out a method of: displaying on the display a first view comprising a portion of the content rendered in the graphics memory containing portions of one or more of the application interfaces; responsive to a navigation command, transitioning to a second view comprising a different portion of the content rendered in the graphics memory containing portions of one or more of the application interfaces, where the transition from the first view to the second view provides the appearance that one or more of the plurality of application interfaces is translating along the planar surface; and on completion of the transition, displaying the second view on the display.

In a further aspect, a non-transitory machine-readable memory is provided storing statements and instructions for execution by a processor for producing a user interface for a portable electronic device. The user interface includes: a plurality of application interfaces forming rendered graphical content, each of the plurality of application interfaces providing a visual representation of an associated application user interface, where the plurality of application interfaces appear to be in a non-overlapping arrangement on a planar surface; a first view comprising a portion of the rendered graphical content containing portions of one or more of the application interfaces; a second view comprising a different portion of the rendered graphical content containing portions of one or more of the application interfaces; and a transitional view, displayed responsive to a navigation command, the transitional view providing a transition from the first view to the second view and providing the appearance that one or more of the plurality of application interfaces is translating along the planar surface.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
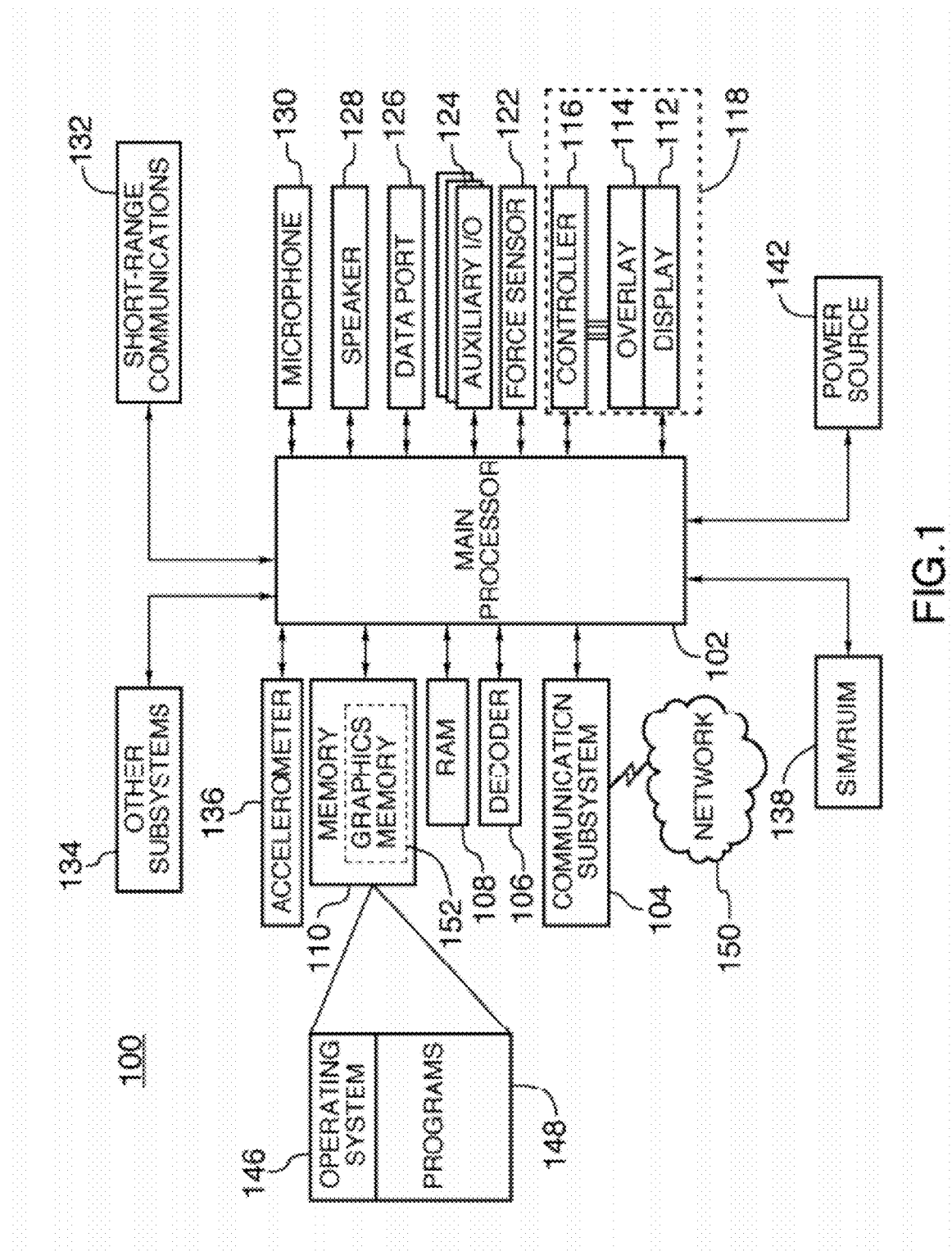
FIG. 1 is a block diagram of a portable electronic device in accordance with an example embodiment.

An electronic device including a display, a processor and a memory. The processor is coupled to the display and the memory to carry out a method of facilitating user interface navigation in the electronic device. In a first view shown on the display, a first application interface provides a visual representation of a first application. In response to receiving a navigational command to access a second application visually represented by a second application interface, a transitional view is displayed including a transition between the first application interface and the second application interface. The displayed transition can be dependent on a property of the received navigational command. The first and second application interfaces can be displayed to appear in a non-overlapping arrangement on a planar surface, and can have sheet-like properties or behaviors.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

This disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, PDAs, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. User-interaction with a graphical user interface presented on display 112 is performed through the touch-sensitive overlay 114. The memory 110 can include graphics memory 152 accessed by the controller 116 to render graphic content for display on to the display 112. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 that may be utilized to detect direction of gravitational forces or gravity-induced reaction forces. The processor 102 may also interact with one or more force sensors 122 so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102.

The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Similarly, multiple simultaneous touches are detected.

One or more gestures are also detected by the touch-sensitive display 118. A gesture, such as a swipe, also known as a flick, is a particular type of touch on a touch-sensitive display 118 that begins at an origin point and continues to a finishing point. A gesture may be identified by attributes of the gesture, including the start point, the end point, the distance traveled, the duration, the velocity, and the direction, for example. A gesture may be long or short in distance and/or duration. Two points of the gesture may be utilized to determine a direction of the gesture.

In some embodiments, optional force sensor(s) 122 may be disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
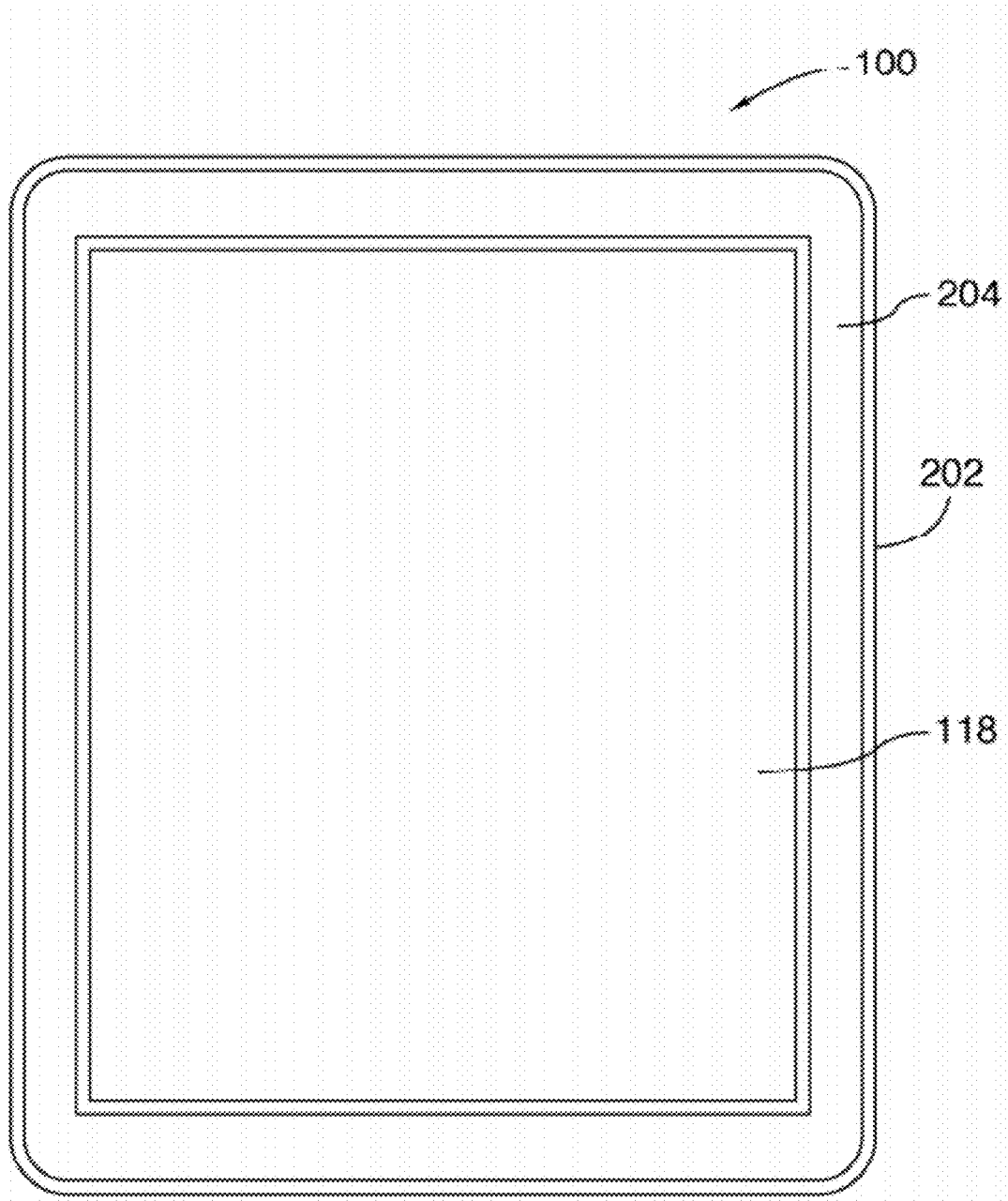
FIG. 2 is a front view of an example of a portable electronic device.

A view of an example of the portable electronic device 100 is shown in FIG. 2. The portable electronic device 100 includes a housing 202 that encloses components such as shown in FIG. 1. The housing 202 may include a front 204, and a back and sidewalls (not shown). The front 204 of the housing includes openings in which the touch-sensitive display 118 is exposed.

In the field of graphical user interfaces, a representation or metaphor that is familiar to a user, often from an unrelated domain, can assist the user in easily navigating and accessing tools and applications. For example, the desktop, file folder, file cabinet, tree view, and recycle bin are all graphical user interface metaphors that have found use in a file system or an operating system.

Most common user interface models (e.g. tiled multiple windows) were developed for the relatively large displays of desktop computers. These user interface models often do not adapt well to devices with small displays. For example, too much display real estate is allocated to show status or other relatively static information that are displayed all of the time. Similarly, the existing user interface models are premised on the basis that information or other application interfaces (e.g. windows) from multiple applications can share the display real estate without being rendered unusably small.

The present disclosure provides a method for facilitating navigation between application interfaces that may be used on a small display such as those in portable electronic devices. Example embodiments of the present disclosure provide a user interface for a portable computing device having a display. The display can be a touch sensitive display. To facilitate interaction with the portable electronic device by a user, the user interface provides, in an embodiment, a plurality of application interfaces. An "application interface" provides a visual representation of an associated application. In an example embodiment, the application interface provides a visual representation of a human-machine interface (HMI) of the associated application. In the present disclosure the term "user interface" represents the collection of application interfaces and other visual features provided on a display.

Figure 3:
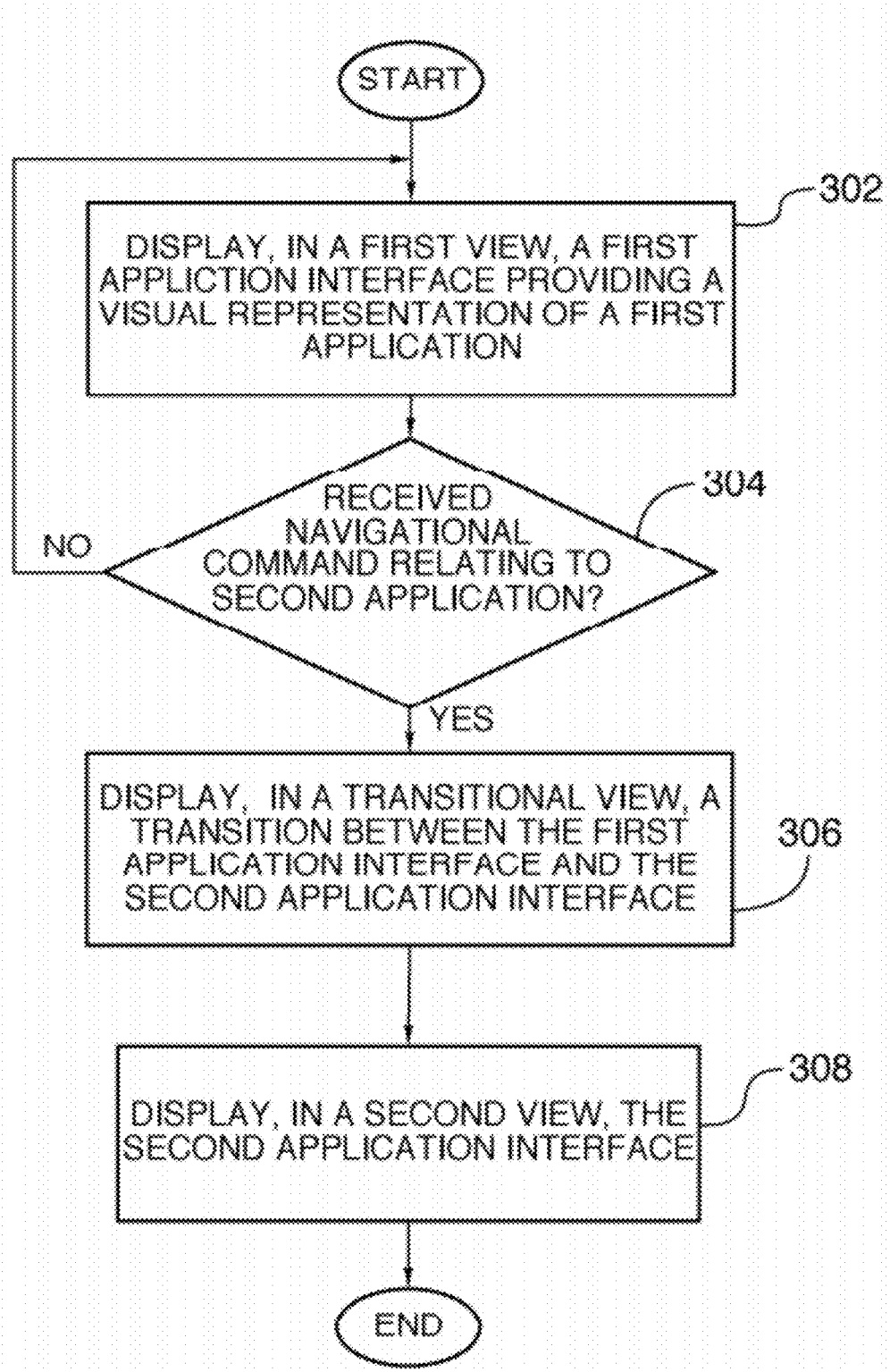
FIG. 3 is a flowchart illustrating a method according to an example embodiment.

FIG. 3 is a flowchart illustrating a method of controlling a portable electronic device, such as the portable electronic device 100, according to an example embodiment. In an example embodiment, the method is carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

The method of the example embodiment of FIG. 3 includes the following: displaying, in a first view, a first application interface providing a visual representation of a first application (step 302); receiving a navigational command to access a second application visually represented by a second application interface (step 304); displaying, in a transitional view on the display and in response to the received navigational command, a transition between the first application interface and the second application interface (step 306); and displaying, in a second view on the display, the second application interface (step 308). Processes shown in FIG. 3 are now described in more detail in relation to further figures.

Figure 4:
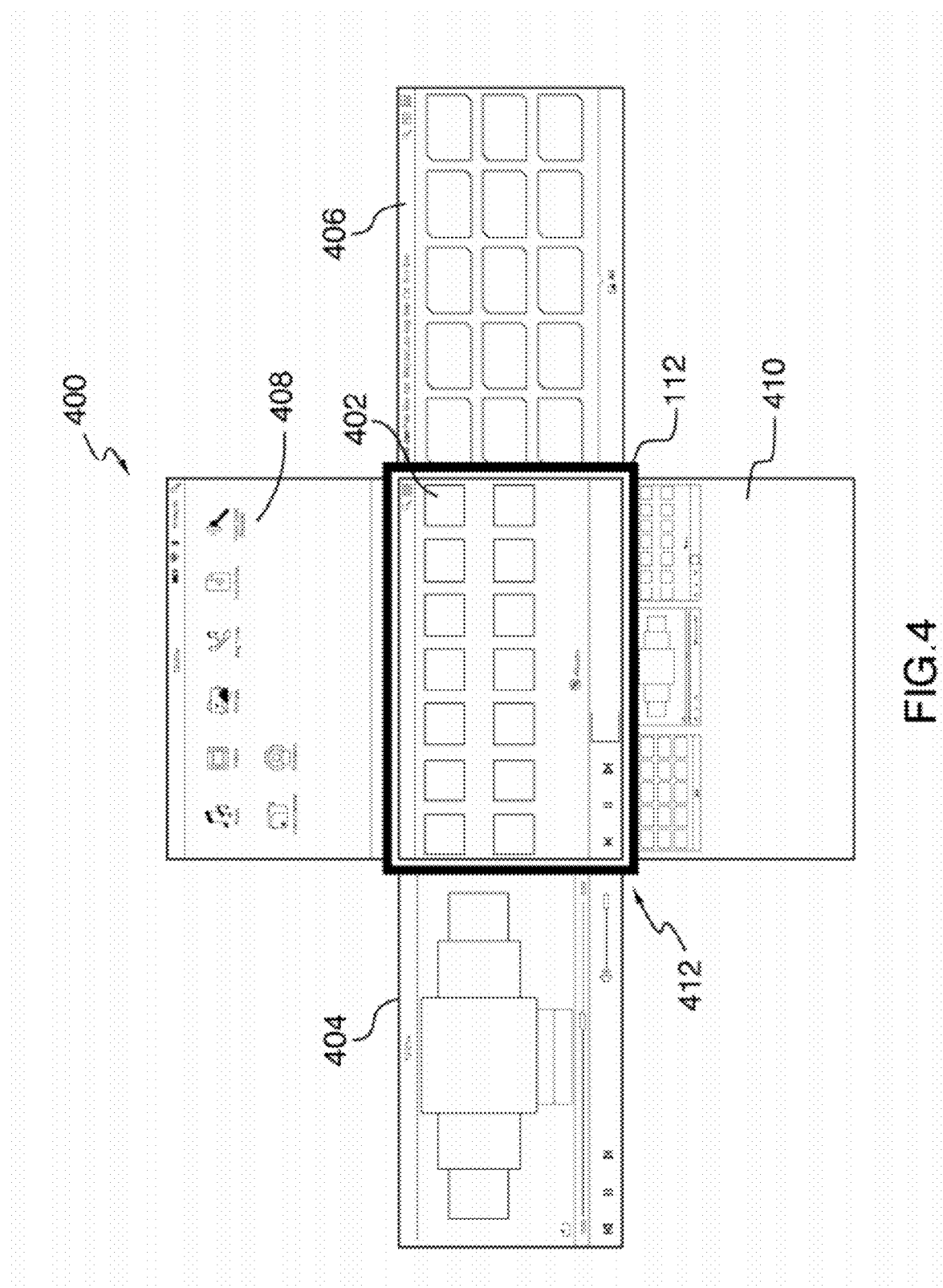
FIG. 4 is a view of an application space and a first view on a display according to an example embodiment.
Figure 5:
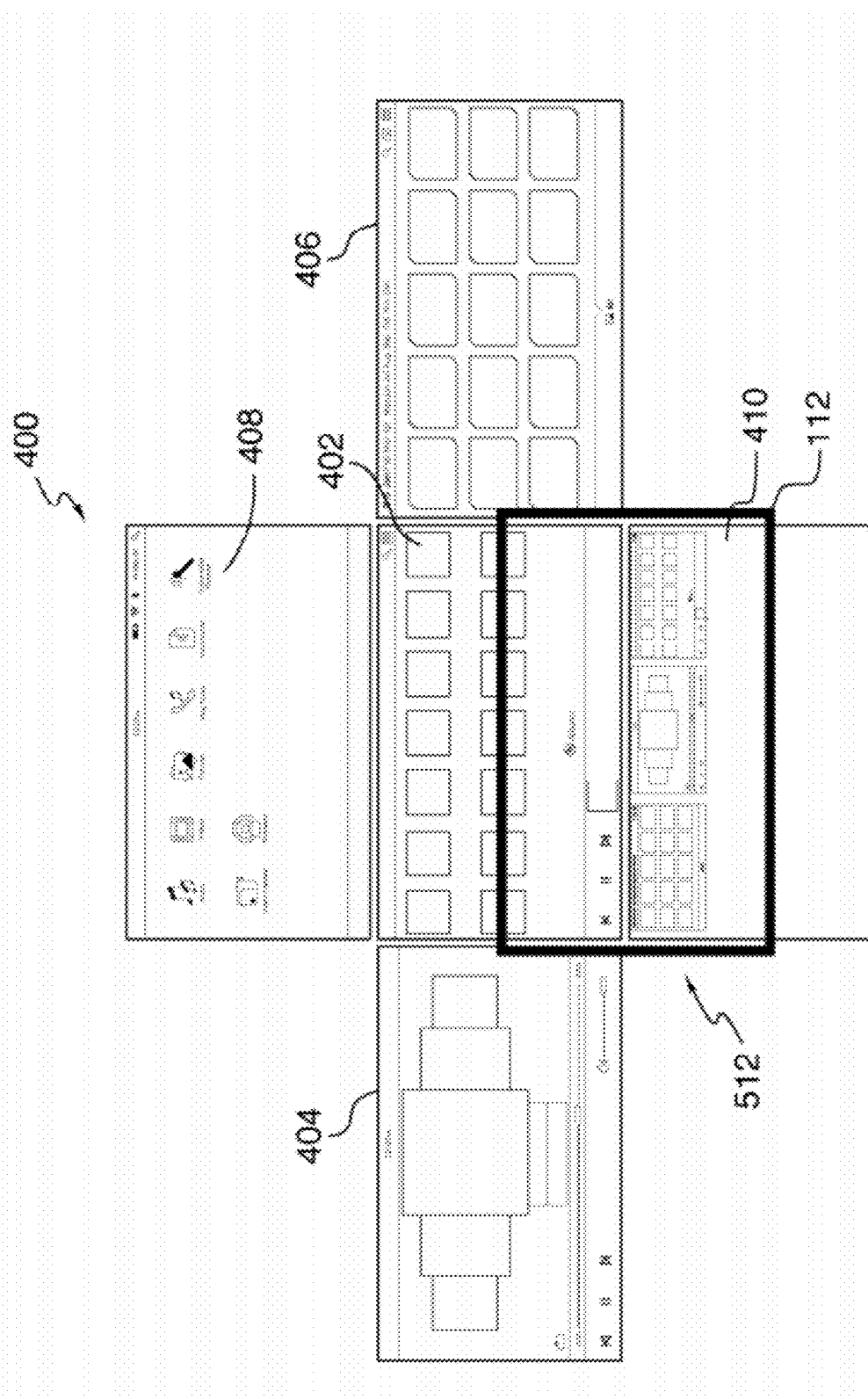
FIG. 5 is a view of an application space and a transitional view on a display according to an example embodiment.
Figure 6:
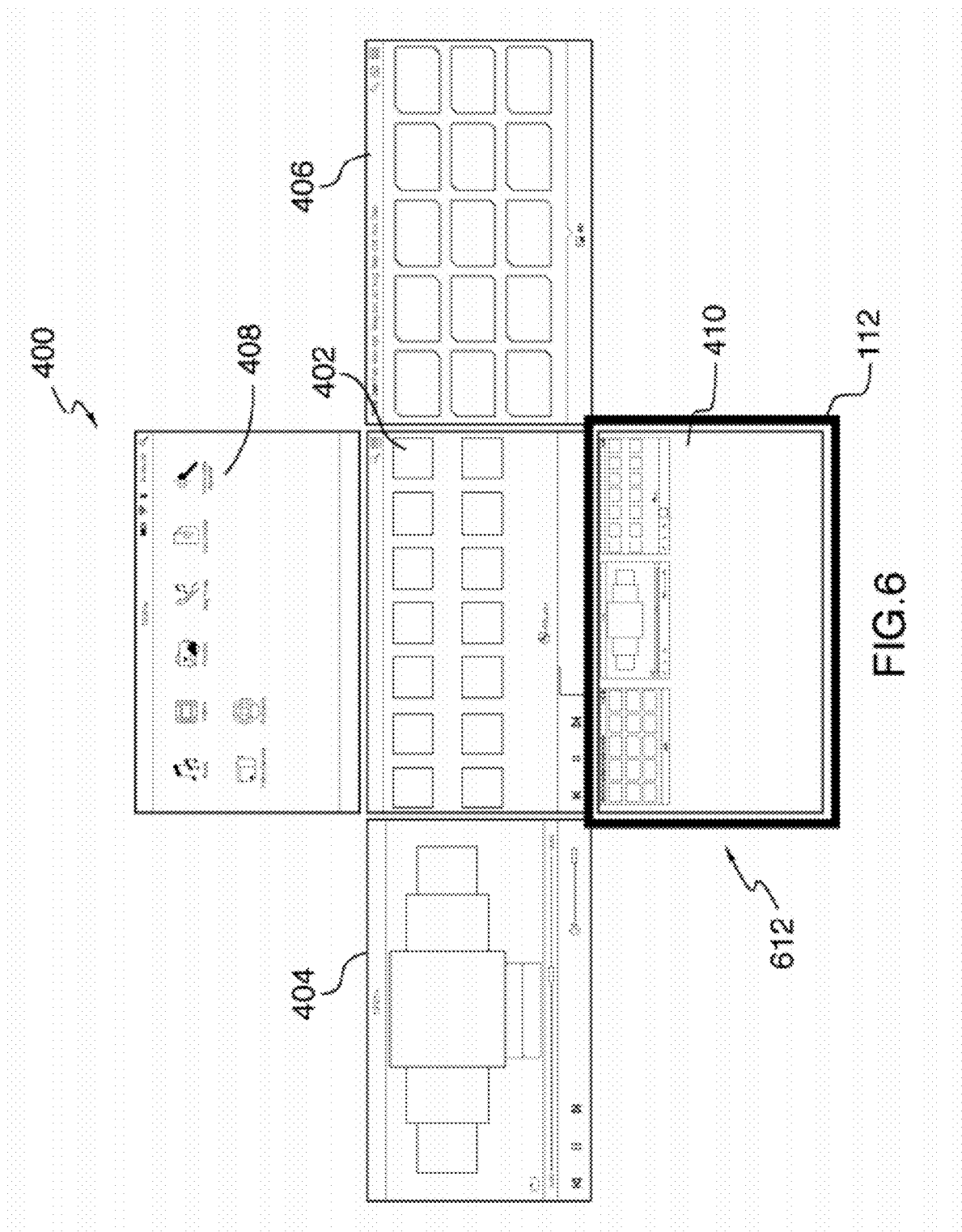
FIG. 6 is a view of an application space and a second view on a display according to an example embodiment.

FIGS. 4-6 illustrate an example embodiment of the first view, as well as the transitional view and the second view displayed in response to the navigational command, such as an upward gesture. The navigational command that causes the application interface transitions described above and further herein is not limited to swiping gestures as described in the examples. The navigational command may take the form of other contact (e.g. touch) gestures, proximity gestures, tilting of the portable electronic device 100, changing the orientation of the portable electronic device 100, pointing device inputs, voice commands, keyboard inputs or other similar user inputs.

FIG. 4 illustrates an application space 400 and a first view 412 on a display 112 according to an example embodiment. The application space 400 includes a plurality of application interfaces 402, 404, 406, 408 and 410, each providing a visual representation of an associated application user interface. In an example embodiment, the first view is provided in a first display state.

In the example embodiment of FIG. 4, the plurality of application interfaces appear to be in a non-overlapping arrangement on a planar surface, with respect to the application space 400. In the first view 412, a first application interface 402 provides a visual representation of a first application. A navigational command is received to access a second application visually represented by a second application interface, which in this case is 410.

As shown in FIG. 5, a transitional view 512 is displayed in response to the received navigational command. In an example embodiment, the transitional view is provided in a transitional display state. In the transitional view 512, a transition between the first application interface 402 and the second application interface 410 is displayed. In an example embodiment, in the transitional view 512 the application interfaces 402 and 410 appear to be in a non-overlapping arrangement on a planar surface with respect to the display 112. In FIG. 6, the second application interface 410 is displayed in the second view 612, which is provided in a second display state in an example embodiment.

The relative spatial arrangement of the plurality of application interfaces visually representing the applications can be used to enhance the user's conscious and unconscious navigational comfort. In an example embodiment, a subset of the application interfaces are arranged in an array (for example, left to right in a horizontal array) in the application space 400, and accessed in such a manner that they form a continuous conveyor. In the example embodiment of FIGS. 4-6, application interfaces 402, 404 and 406 are included in this horizontal array. In another embodiment, the application interfaces are arranged in a matrix.

System functions are, in the example embodiment of FIGS. 4-6, provided in the application space 400 above and below the application interface 402 which provides a visual representation of the active application. An application launcher interface 408 and application switcher interface 410 are system function applications shown visually in the embodiment of FIGS. 4-6. In an example embodiment, from any application interface in the continuous conveyor, the application launcher interface 408 is accessible by a downward gesture, and the application switcher interface 410 is accessible by an upward gesture.

In an example embodiment, at least some of the plurality of application interfaces have sheet-like properties, or sheet-like behaviors, or both. According to an example embodiment, the plurality of application interfaces for individual applications, including system functions, can be visually represented as a sheet, such as a 'sheet of paper' laid out on a 2-dimensional surface. For example, some application interfaces may behave like sheets, such as sheets of paper, during navigation between application interfaces. In example embodiments, all, or substantially all, of the viewable real estate of the display 112 is dedicated to displaying one individual 'sheet' (i.e. one single application interface) at a time.

In example embodiments, different sheet-like transitions are displayed in response to different navigational commands. In the example embodiment of FIG. 5, the displayed transition in view 512 comprises a vertical translational movement according to which the application switcher interface 410 appears like a sheet sliding up onto the display 112, and the application interface 402 appears like a sheet sliding upward off the display 112. In this example embodiment, the navigational command may be an upward swiping gesture.

In another example embodiment, the navigational command may be a downward swiping gesture. In response to the navigational command, the application interface 402 appears like a sheet sliding downward off of the display 112 and an application launcher interface 408 appears like a sheet sliding down on to the display 112.

Figure 7:
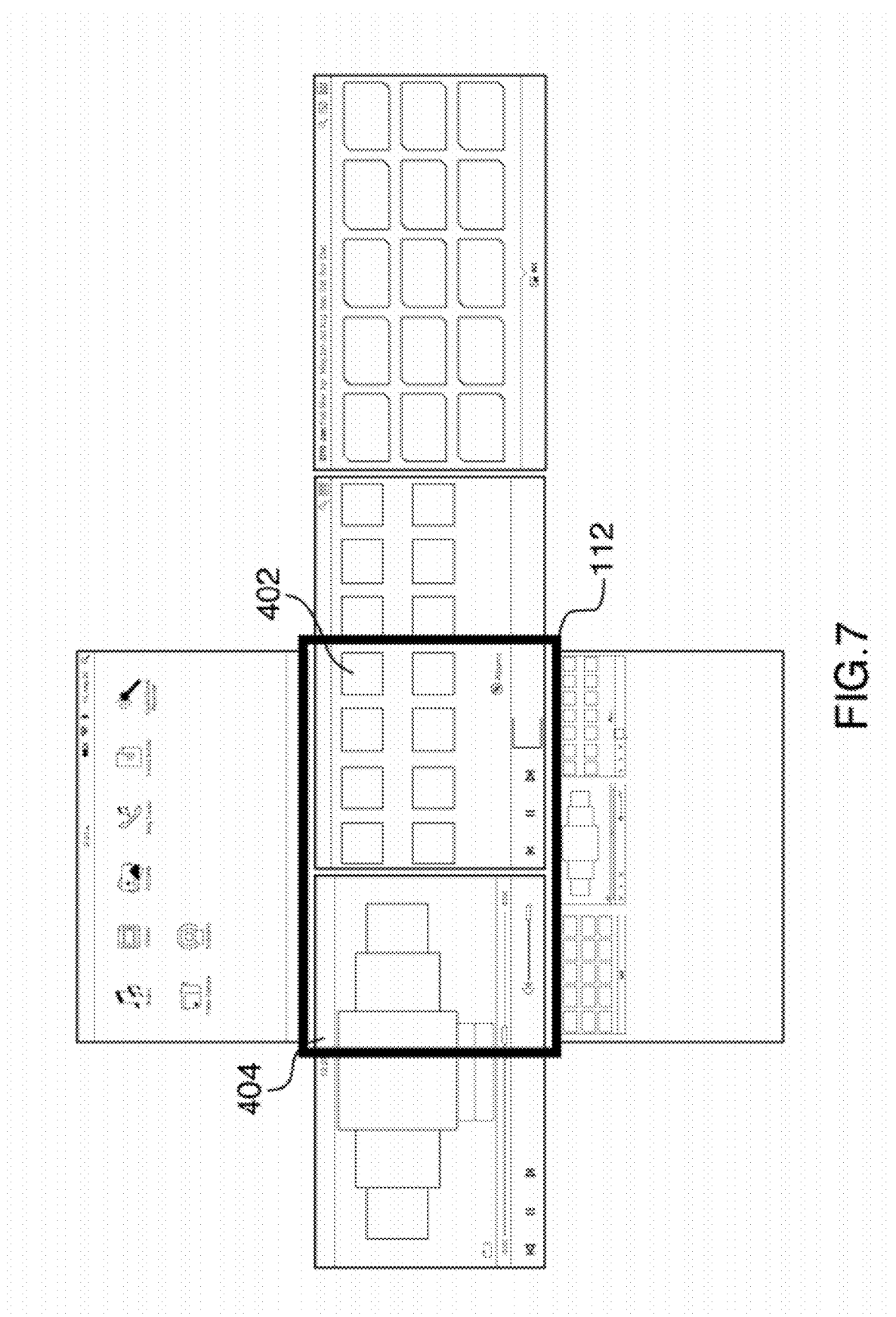
FIG. 7 is a view of a displayed transition comprising a translational movement according to an example embodiment.

FIG. 7 is a view of a displayed transition comprising a translational movement according to an example embodiment. In the example embodiment of FIG. 7, the application interface 404 appears to have a horizontal translational movement from left to right into, or onto, the display 112. At the same time, the application interface 402 appears to have a horizontal translational movement from left to right out of, or off of, the display 112.

In the view in FIG. 7, the displayed transition between the first application interface and the second application interface comprises a portion of the first application interface and a portion of the second application interface. The displayed portions of the application interfaces 402 and 404 for the first and second applications can be determined or sized based on the stage of the transition, such as to represent a smooth transition of the interface. In an example embodiment, half way through the transition, the interfaces 402 and 404 each take up about 50% of the display, and ¾ of the way through, the interface 402 takes up about 25% and the interface 404 takes up about 75% of the display.

While navigation between the application interfaces, and the applications represented by the application interfaces, is described in an example embodiment herein as sheets being moved around on a 2-dimensional surface, the application interfaces, or individual sheets, are not limited to appearing to have movement in 2-dimensions. In an example embodiment, the application interfaces have 3-dimensional behaviors such as, for example, corner curls, or a sheet can be flipped over the expose content on its reverse side.

Figure 8:
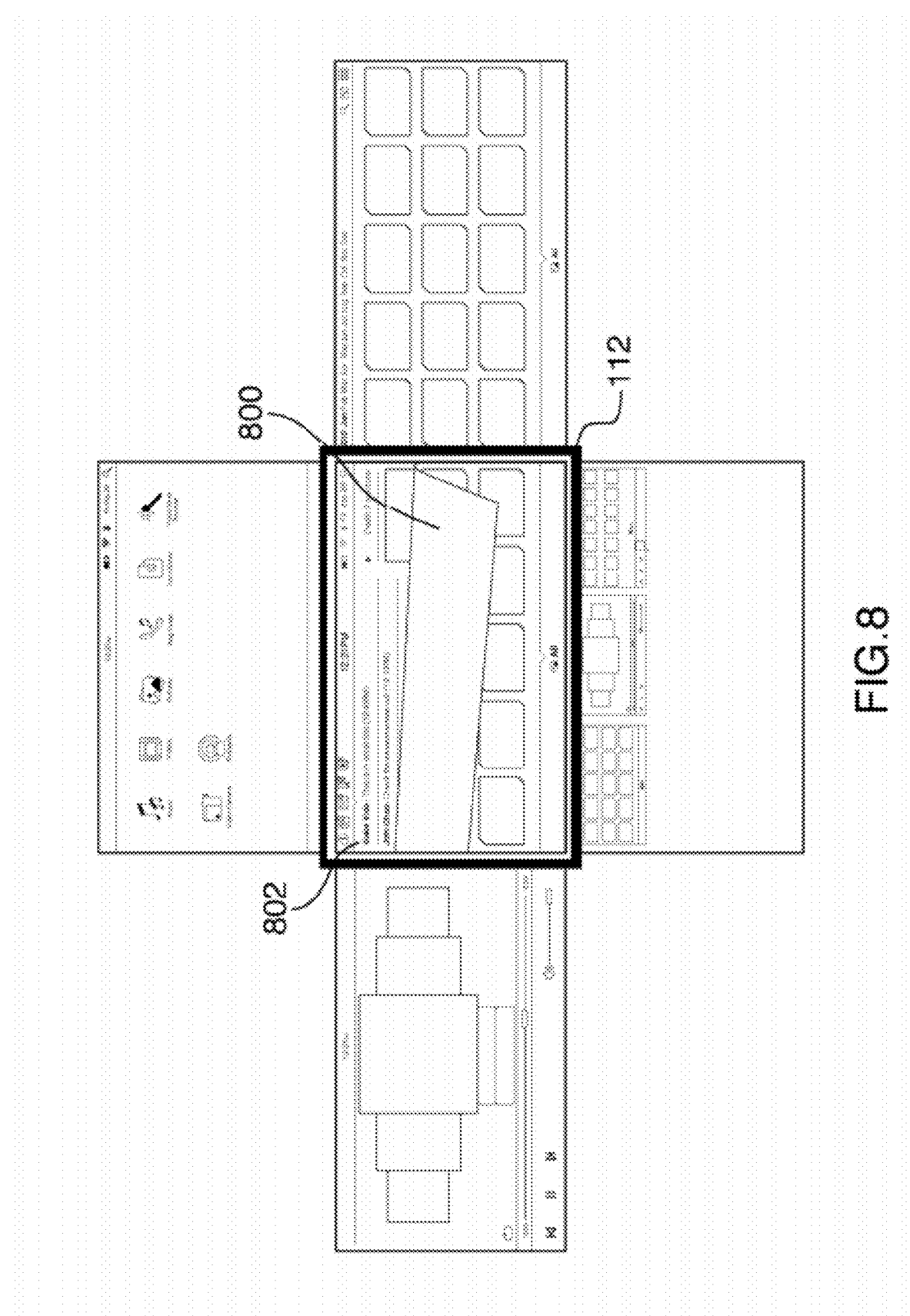
FIG. 8 is a view of a displayed transition comprising a folding movement according to an example embodiment.

FIG. 8 is a view of a displayed transition comprising a folding or curling movement according to an example embodiment. In an example embodiment, a user inputs a navigational command that may be a gesture originating from a corner of the display 112. In a transitional view shown in FIG. 8, in response to the navigational command, a corresponding edge or corner of the application interface 800 is made to appear like a corner of a sheet being curled downward. This folding or curling movement exposes an area 802 previously covered (e.g. hidden) by the application interface 800. The newly exposed area 802 may contain information such as, for example, system status information, or alert information, or both. In an example embodiment, a further navigational command causes the previously curled corner of the interface 800 to uncurl.

Figure 9:
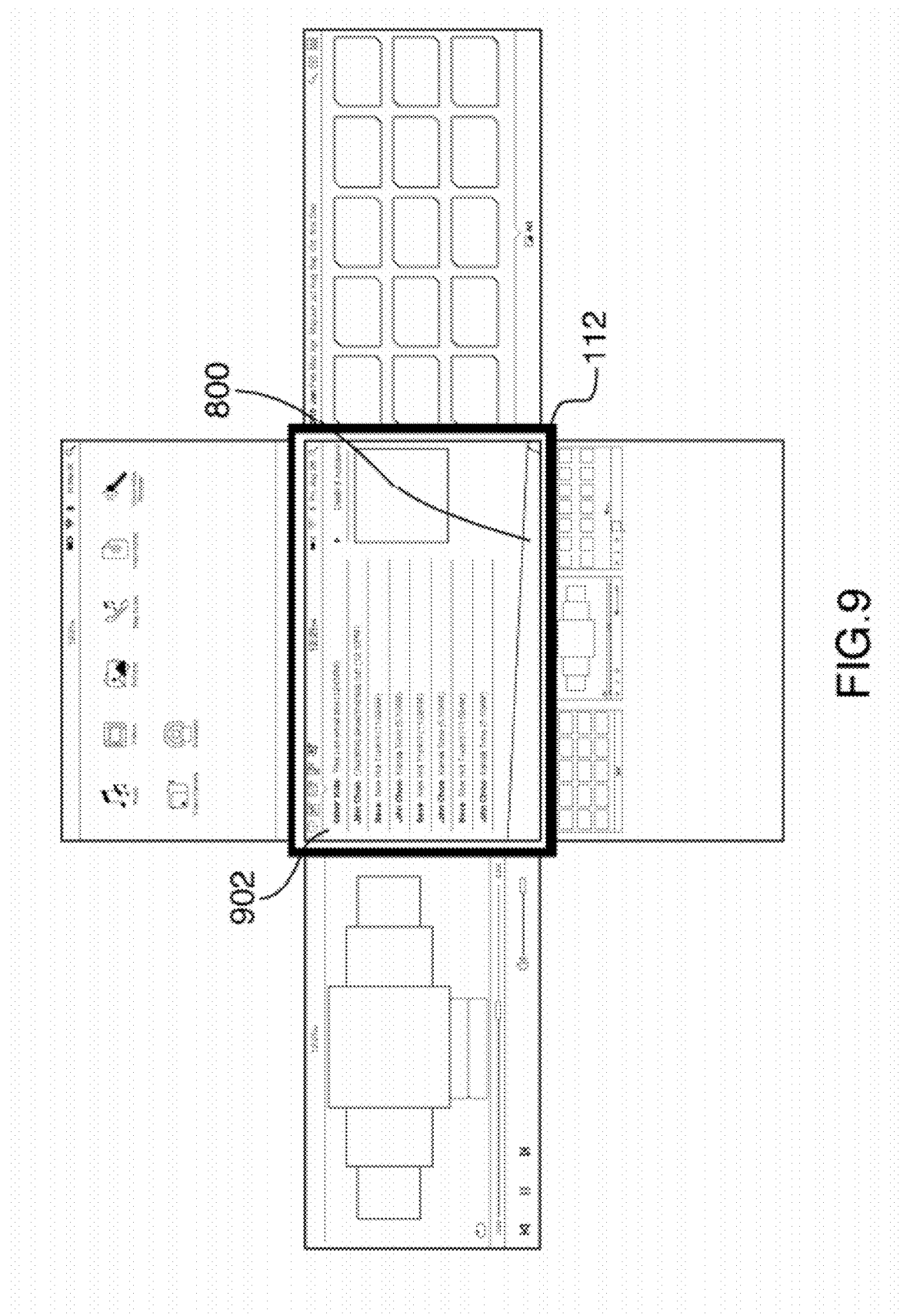
FIG. 9 is a view of a displayed transition comprising another folding movement according to an example embodiment.

FIG. 9 is a view of a device display illustrating a displayed transition comprising another folding movement, similar to FIG. 8, according to an example embodiment. In FIG. 9, the application interface 800 of the first application appears to be a sheet that is curled downward from an edge of the sheet to expose a relatively larger area 902 previously covered by the interface 800. The exposed area 902 may contain system, status, notification, configuration or other similar information or interfaces. The previously curled sheet of the interface 800 may subsequently be uncurled to its previous appearance in response to a further navigational command.

Figure 10:
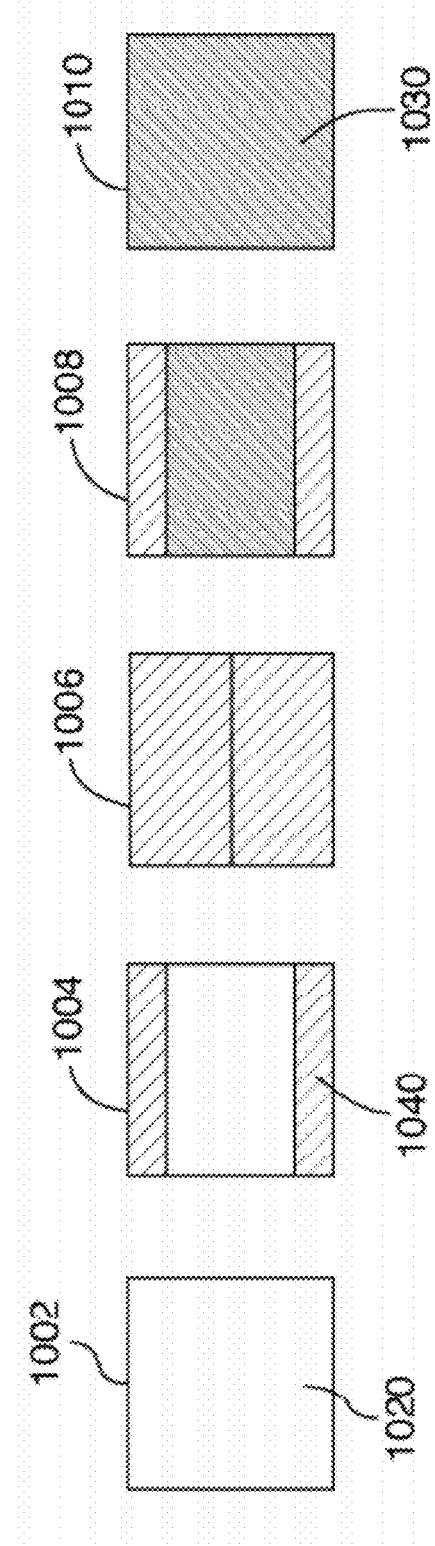
FIG. 10 is a view of a displayed transition comprising a rotational movement according to an example embodiment.
Figure 11:
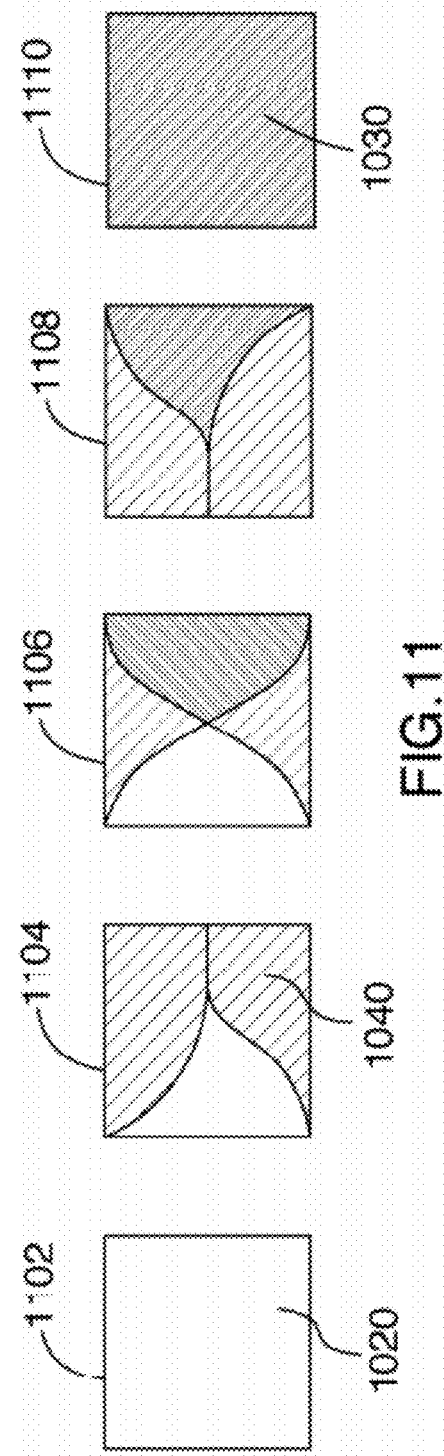
FIG. 11 is a view of a displayed transition comprising a twisting movement according to an example embodiment.

FIG. 10 and FIG. 11 illustrate views of a displayed transition comprising a rotational movement and a twisting movement, respectively, according to an example embodiment. In both FIG. 10 and FIG. 11, time sequences are illustrated (time moving from left to right), each one showing a diagrammatical sketch of an example display at various points in time. The time sequences are represented in FIG. 10 by exemplary displays 1002 through 1010, and in FIG. 11 by exemplary displays 1102 through 1110. A transition is provided from a front face 1020 of a sheet displaying a first application interface to a back face 1030 displaying a second application interface.

In FIGS. 10 and 11, the front face 1020 is white and the back face 1030 is dark. The areas 1040 with diagonal hash lines represent the portions of the display 112 that become uncovered as the sheet transitions from the front face 1020 to the back face 1030. FIG. 10 shows a transition of the sheet by rotating it about a horizontal axis that dissects the sheet at its vertical midway point. FIG. 11 shows a transition of the sheet by twisting over the sheet starting from the right-hand vertical edge.

In an example embodiment, the transition of FIG. 10 is displayed in response to a user inputting a navigational command that may be a gesture along an axis substantially parallel or substantially perpendicular to an edge of the display 112. In another example embodiment, the transition of FIG. 11 is displayed in response to a user inputting a navigational command that may be a gesture along an axis substantially diagonal to an edge of the display 112, or along an axis extending from a corner of the display 112.

Referring back to FIGS. 4-6, in an example embodiment an application interface such as the application interface 402 is displayed to substantially fill the display 112. In an alternative example embodiment, one or more application interfaces appear on the display 112 at the same time, and some application interfaces may only fill a portion of the display 112.

With reference to FIGS. 4-6, the application space 400 can be considered as a user interface for a portable electronic device 100. In an aspect, a non-transitory machine-readable memory is provided storing statements and instructions for execution by a processor for producing the user interface. The user interface includes a plurality of application interfaces forming rendered graphical content. Each of the plurality of application interfaces provides a visual representation of an associated application interface. In an example embodiment, the plurality of application interfaces appear to be in a non-overlapping arrangement on a planar surface.

The user interface provides: a first view comprising a portion of the rendered graphical content containing portions of one or more of the application interfaces, such as shown in FIG. 4; a second view comprising a different portion of the rendered graphical content containing portions of one or more of the application interfaces, such as shown in FIG. 6; and a transitional view, displayed responsive to a navigation command, such as shown in FIG. 5. The transitional view provides a transition from the first view to the second view, and in an embodiment provides the appearance that one or more of the plurality of application interfaces is translating along the planar surface. Referring back to FIG. 4, in an example embodiment, a navigational command has the effect of "moving" the display 112 around in the application space 400, such that the display 112 acts as a "portal", or a window, to reveal an area of the application space 400 to generate the different views described and illustrated herein.

In another aspect, the portable electronic device 100 includes a memory 110 including a graphics memory 152, and a controller 116 to render in the graphics memory 152: a plurality of application interfaces 402, 404, 406, 408 and 410, each providing a visual representation of an associated application, where the plurality of application interfaces 402, 404, 406, 408 and 410 appear to be in a non-overlapping arrangement on a planar surface. The portable electronic device 100 further includes a display 112 to display a portion of the content rendered to the graphics memory 152, the memory 110, and a processor 102 coupled to the memory 110, the controller 116, and the display 112. The memory 110 stores statements and instructions for execution by the processor 102 to carry out a method of: displaying in the display 112 a first view comprising a portion of the content rendered in the graphics memory 152 containing portions of one or more of the application interfaces 402, 404, 406, 408 and 410; responsive to a navigation command, transitioning to a second view comprising a different portion of the content rendered in the graphics memory containing portions of one or more of the application interfaces 402, 404, 406, 408 and 410, where the transition from the first view to the second view provides the appearance that one or more of the plurality of application interfaces 402, 404, 406, 408 and 410 is translating along the planar surface; and on completion of the transition, displaying the second view on the display.

Embodiments of the disclosure provide for improved user interface navigation on a portable electronic device display. Transitions between a first application interface and a second application interface can be achieved using a model that is familiar to users, and provides an appealing visual experience.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A portable electronic device comprising:
   a display;
   a memory;
   a processor coupled to the display and the memory, the memory storing statements and instructions for execution by the processor to carry out a method of:
      displaying, in a first view on the display, a first application interface providing a visual representation of a first application;
      receiving a navigational command to access a second application visually represented by a second application interface;
      displaying, in a transitional view on the display and in response to the received navigational command, a transition between the first application interface and the second application interface, the transitional view including the first and second application interfaces displayed as appearing in a non-overlapping arrangement on a planar surface, and the transitional view further including the first and second application interfaces displayed as moving translationally along the planar surface; and
      displaying, in a second view on the display, the second application interface.

2. The portable electronic device of claim 1 wherein the displayed transition between the first application interface and the second application interface is dependent on a property of the received navigational command.

3. The portable electronic device of claim 1 wherein the displayed transition between the first application interface and the second application interface comprises a portion of the first application interface and a portion of the second application interface.

4. The portable electronic device of claim 1 wherein the first and second application interfaces have sheet-like properties.

5. The portable electronic device of claim 1, wherein the method carried out by the processor further comprises:
   prior to displaying, in a first view on the display, the first application interface providing a visual representation of a first application, providing a user interface comprising the first application interface and the second application interface, the first application interface and the second application interface being in a non-overlapping arrangement.

6. The portable electronic device of claim 1, wherein the method carried out by the processor further comprises:
   prior to displaying, in a first view on the display of the portable electronic device, a first application interface providing a visual representation of a first application, rendering on an application space on the display, a plurality of application interfaces in a non-overlapping arrangement on the planar surface, each of the plurality of application interfaces providing a visual representation of an associated application user interface.

7. A method comprising:
   displaying, in a first view on a display of a portable electronic device, a first application interface providing a visual representation of a first application;
   receiving a navigational command to access a second application visually represented by a second application interface;
   displaying, in a transitional view on the display and in response to the received navigational command, a transition between the first application interface and the second application interface, the transitional view including the first and second application interfaces displayed as appearing in a non-overlapping arrangement on a planar surface, and the transitional view further including the first and second application interfaces displayed as moving translationally along the planar surface; and
   displaying, in a second view on the display, the second application interface.

8. The method of claim 7 wherein displaying the transition between the first application interface and the second application interface is dependent on a property of the received navigational command.

9. The method of claim 7 wherein displaying the transitional view comprises displaying a portion of the first application interface and a portion of the second application interface.

10. The method of claim 7 wherein the first and second application interfaces have sheet-like properties.

11. The method of claim 7, further comprising:
    prior to displaying, in a first view on a display of a portable electronic device, the first application interface providing a visual representation of a first application, providing a user interface comprising the first application interface and the second application interface, the first application interface and the second application interface being in a non-overlapping arrangement such that the first application interface and the second application interface are represented as a sheet laid out on a two-dimensional surface.

12. The method of claim 7, further comprising:
    prior to displaying, in a first view on a display of a portable electronic device, a first application interface providing a visual representation of a first application, rendering on an application space on the display, a plurality of application interfaces in a non-overlapping arrangement on the planar surface, each of the plurality of application interfaces providing a visual representation of an associated application user interface.

13. A non-transitory machine-readable memory storing statements and instructions for execution by a processor to perform a method of:
    displaying, in a first view on a display of a portable electronic device, a first application interface providing a visual representation of a first application;
    receiving a navigational command to access a second application visually represented by a second application interface;
    displaying, in a transitional view on the display and in response to the received navigational command, a transition between the first application interface and the second application interface, the transitional view including the first and second application interfaces displayed as appearing in a non-overlapping arrangement on a planar surface, and the transitional view further including the first and second application interfaces displayed as moving translationally along the planar surface; and displaying, in a second view on the display, the second application interface.

14. The non-transitory machine-readable memory of claim 13 wherein the displayed transition between the first application interface and the second application interface is dependent on a property of the received navigational command.

15. A portable electronic device comprising:
a display;
a memory;
a graphics memory;
a graphics engine;
a processor coupled to the display, the memory, the graphics memory and the graphics engine, the memory storing statements and instructions for execution by the processor to carry out a method of:

configuring the graphics engine to render in the graphics memory a content including a plurality of application interfaces in a non-overlapping arrangement on a planar surface, each application interface providing a visual representation of an associated application user interface;

displaying on the display a first view comprising a portion of the content rendered in the graphics memory containing portions of one or more of the application interfaces;

responsive to a navigation command, transitioning to a second view comprising a different portion of the content rendered in the graphics memory containing portions of one or more of the application interfaces, the transition from the first view to the second view providing an appearance that two or more of the plurality of application interfaces are translating along the planar surface; and on completion of the transition, displaying the second view on the display.

* * * * *